(12) United States Patent
Sun et al.

(10) Patent No.: US 10,445,926 B2
(45) Date of Patent: Oct. 15, 2019

(54) LIGHT PATH CORRELATION IN DIGITAL IMAGE RENDERING OF A DIGITAL SCENE

(71) Applicant: Adobe Inc., San Jose, CA (US)

(72) Inventors: Xin Sun, Sunnyvale, CA (US); Weilun Sun, San Diego, CA (US); Nathan Aaron Carr, San Jose, CA (US)

(73) Assignee: Adobe Inc., San Jose, CA (US)

( * ) Notice: Subject to any disclaimer, the term of this patent is extended or adjusted under 35 U.S.C. 154(b) by 29 days.

(21) Appl. No.: 15/403,903

(22) Filed: Jan. 11, 2017

(65) Prior Publication Data
US 2018/0197327 A1 Jul. 12, 2018

(51) Int. Cl.
G06T 15/50 (2011.01)
G06T 15/06 (2011.01)

(52) U.S. Cl.
CPC ............ *G06T 15/506* (2013.01); *G06T 15/06* (2013.01)

(58) Field of Classification Search
None
See application file for complete search history.

(56) References Cited

U.S. PATENT DOCUMENTS

| | | | | |
|---|---|---|---|---|
| 8,279,220 B1* | 10/2012 | Pantaleoni | ............... | G06T 15/50 345/426 |
| 8,538,204 B1* | 9/2013 | Pantaleoni | ........... | G06K 9/4661 345/419 |
| 8,922,556 B2* | 12/2014 | Xin | ........................ | G06T 15/506 345/426 |
| 9,501,865 B2* | 11/2016 | Gautron | .................. | G06T 15/50 |
| 2010/0033482 A1* | 2/2010 | Zhou | ........................ | G06T 15/06 345/424 |
| 2014/0313198 A1* | 10/2014 | Keller | ...................... | G06T 15/06 345/426 |
| 2014/0340403 A1* | 11/2014 | Droske | ................... | G06T 15/06 345/426 |
| 2016/0005209 A1* | 1/2016 | Dachsbacher | .......... | G06T 15/06 345/426 |
| 2017/0278296 A1* | 9/2017 | Chui | ........................ | G06T 17/10 |

(Continued)

OTHER PUBLICATIONS

Bhat,"Fourier Analysis of the 2D Screened Poisson Equation for Gradient Domain Problems", ECCV, 2008, 14 pages.

(Continued)

*Primary Examiner* — Hilina K Demeter
(74) *Attorney, Agent, or Firm* — SBMC (57) ABSTRACT

Techniques and systems are described that support light path correlation in digital image rendering of a digital scene. In one example, a plurality of light paths between a light source and the digital image to be rendered of a digital scene are identified by a computing device. Each light path of the plurality of light paths includes a primary vertex and a secondary vertex between respective segments of the light path. A plurality of correlated samples is then generated by the computing device from the light paths. Each correlated sample of the plurality of correlated samples is based at least in part on similarity of the secondary vertex of respective said light paths to each other, e.g., on location, geometric normal, or surface material properties. The digital image of the digital scene is then rendered by the computing device based at least in part on the plurality of correlated samples.

20 Claims, 7 Drawing Sheets

(56) References Cited

U.S. PATENT DOCUMENTS

2017/0358123 A1* 12/2017 Novak .................... G06T 15/06
2018/0089894 A1* 3/2018 Sun ....................... G06T 19/006

OTHER PUBLICATIONS

Keller,"Hierarchical Monte Carlo Image Synthesis", Mathematics and Computers in Simulation (MATCOM) 55, 1, Feb. 11, 2002, 17 pages.
Kettunen,"Gradient-Domain Path Tracing", ACM Trans. Graph. 34, 4, Jul. 27, 2015, 13 pages.
Lehtinen,"Gradient-Domain Metropolis Light Transport", ACM Trans. Graph. 32, 4, Jul. 2013, 11 pages.
Manzi,"Improved Sampling for Gradient-Domain Metropolis Light Transport", ACM Trans. Graph. 33, 6, Nov. 19, 2014, 12 pages.
Ruderman,"The statistics of natural images", Network: Computation in Neural Systems 5, Jul. 26, 1994, 32 pages.
Veach,"Robust Monte Carlo Methods for Light Transport Simulation", Dec. 1997.

* cited by examiner

LIGHT PATH CORRELATION IN DIGITAL IMAGE RENDERING OF A DIGITAL SCENE

BACKGROUND

Digital image rendering of digital scenes has advanced to provide photo realistic results in a wide range of scenarios, such as movie production and industrial design. For example, it is now common to view digital images that include a photo realistic view of a digital scene in a fully animated movie, as an addition to a movie (e.g., an animated character), as standalone digital images, as part of advertisements, and so forth.

In order to provide these photo realistic results, techniques have been developed to enable computing devices to render a digital image that is consistent with an appearance of the digital scene in the real world. The computing devices achieve this by addressing a variety of characteristics of the digital scene that is to serve as a basis for rendering of the digital image. These characteristics include geometries of objects included in the scene, material surface properties of the objects, lighting, and position of a virtual "camera" that defines a viewpoint at which the digital scene is viewed.

A major factor in achievement of consistency of the appearance of the digital image with the real world is accurate simulation of light transport in the digital scene that follows actual physical laws of the real world. This includes how light is emitted from a light source and transported through the digital scene, including an effect of light as reflecting off objects in the scene and material and other properties of those objects which cause changes to the light. Simulation of this light transport as consistent with the real world thus involves addressing a variety of factors by the computing device to enable a digital image that is rendered of the digital scene to have a photo realistic appearance as if the digital image was taken in the real world.

One conventional technique that is widely used to accurately simulate light transport in the digital scene is referred to as a Monte Carlo technique. The Monte Carlo technique is viewed in industry as the standard solution used to achieve photo realistic results with sufficient reliability and high fidelity, e.g., for use in animated movies.

A drawback of the Monte Carlo technique, however, is its extremely high computational cost, which limits availability of this technique. In order to simulate light transport in the digital scene, for instance, the Monte Carlo technique employs a computing device to generate light path samples that connect light sources to a "camera" that represents a viewpoint of the scene that is used as a basis to render the digital image. Light transport is computed from those light paths by the computing device to obtain a final color for each pixel of the digital image to "capture" the digital image scene. If the sample size (i.e., the number of light paths) is small, the resulting rendered digital image typically exhibits a large amount of noise. Accordingly, in practice a multitude of light paths are sampled to render the digital image, thereby increasing a computation load in this rendering by the computing device. This is further exacerbated by complexity of the digital scene due to objects and material properties of those objects in order to calculate an effect of each of the light paths on light transport within the digital scene. Consequently, use of these conventional techniques is typically limited to entities that have a significant amount of computational resources available. Further, even when available, these conventional techniques may still take a significant amount of time to perform, e.g., to render individual digital images as frames of a movie.

SUMMARY

Techniques and systems are described that support light path correlation in digital image rendering of a digital scene. In these techniques, a general correlated Monte Carlo sampling technique is described such that a reduced number of samples are used as a basis to render a digital image as opposed to conventional Monte Carlo techniques that require processing of every light path in a digital scene. The correlation of the samples is determined by a computing device based on similarities of properties of light paths instead of reliance on location of pixels as adjacent to each other in a digital image. Examples of properties that may be used as a basis for this determination of similarity by a computing device include location (e.g., spatial distance), geometry normal and surface material. Thus, these techniques accurately reflect light transport in a digital scene that serves as a basis to render the digital image, have decreased computational costs, and reduce visible artifacts.

In one example, a plurality of light paths between a light source and the digital image to be rendered of a digital scene is identified by a computing device. Each light path of the plurality of light paths includes a primary vertex and a secondary vertex between respective segments of the light path. A plurality of correlated samples is then generated by the computing device from the light paths. Each correlated sample of the plurality of correlated samples is based at least in part on similarity of the secondary vertex of respective light paths to each other, e.g., on location, geometric normal, or surface material properties. The digital image of the digital scene is then rendered by the computing device based at least in part on the plurality of correlated samples.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Accurate synthesis of light transport by a computing device within a digital scene is one of the primary techniques used by a computing device to achieve a photo realistic digital image of the digital scene. The standard conventional technique to do so is referred to as a Monte Carlo technique in which an effect of a multitude of light paths within the digital scene are sampled individually to generate a final color for each pixel of the digital image. This multitude is used to protect against introduction of noise within the image caused by variance between samples of the light paths. This technique, however, consumes a significant amount of computational resources in order to process the multitude of light paths and thus limits availability of this technique to users having access to significant amounts of computational resources and time in which to use these resources.

To address this, additional conventional techniques have been developed to support correlated sampling in order to render pixels of the digital through use of a reduced number of correlated smaples. The underlying idea used to support this conventional technique is that the difference between a pair of correlated samples usually exhibits reduced variance than either of these samples, alone, and thus may be used to reduce a sample size used to render the digital image. Thus, accuracy of a single light path sample used to define a color of a pixel may be improved by taking into account the difference of the light path with its correlated light paths. In conventional techniques, this is performed by deterministically shifting a primary intersection vertex of a light path (e.g., a "first bounce" of the light path in the digital scene) to fall onto an adjacent pixel of the digital image. Therefore, the difference between the pixels defines a gradient in the rendering of the digital image, which is the reason why these techniques are commonly referred to a gradient domain Monte Carlo rendering.

In practice, however, light paths in Monte Carlo rendering lie in a high dimensional sampling space (e.g., in three dimensions having a size defined by the digital scene) whereas an image space of the digital image (and therefore pixels of the digital image) is a low dimensional projection of the light path space. This means that in practice a correlation between light paths as performed in a gradient domain as described above may be irrelevant to positioning of the pixels in relation to each other in the digital image. Thus, the underlying idea behind conventional gradient domain Monte Carlo rendering is inaccurate and may result in errors (e.g., noise) in the rendering of the digital image.

Accordingly, light path correlation techniques and systems are described in digital image rendering of a digital scene. In these techniques, properties along the light paths, themselves, are used as a basis to correlate the light paths as being similar to each other, rather than relying on whether pixels are adjacent to each other in a digital image. In this way, the correlation may address the high dimensionality of the sampling space of the digital scene to arrive at a reduced sample size of correlated paths that have a decreased likelihood of variance, one to another, and thus increase accuracy and reduce noise in the rendering of the digital image.

The similarity of the light paths to each other may be determined by a computing device in a variety of ways. In one example, the similarity is based on similarity of locations of vertices of the light path, i.e., a spatial distance between the vertices. Vertices correspond to "bounce" (i.e., reflection) locations of the light path that join segments of the light path to each other, e.g., a location at which the light path was redirected/reflected by an object in the digital scene. Thus, similarity of locations of vertices may be used as a basis to correlate light paths to each other. This may be further extended to take into account similarity of surface material properties, geometric normal (e.g., a vector that is perpendicular to a surface of an object), and other properties of surfaces of objects in the digital scene to further improve accuracy of this correlation. As a result, variance and resulting errors are reduced in the rendering of the digital image at decreased computational cost through use of the reduced sample size of the correlated samples. Further discussion of these and other examples is included in the following sections and shown in corresponding figures.

In the following discussion, an example environment is described that may employ the correlation and rendering techniques described herein. Example procedures are also described which may be performed in the example environment as well as other environments. Consequently, performance of the example procedures is not limited to the example environment and the example environment is not limited to performance of the example procedures.

Example Environment

Figure 1:
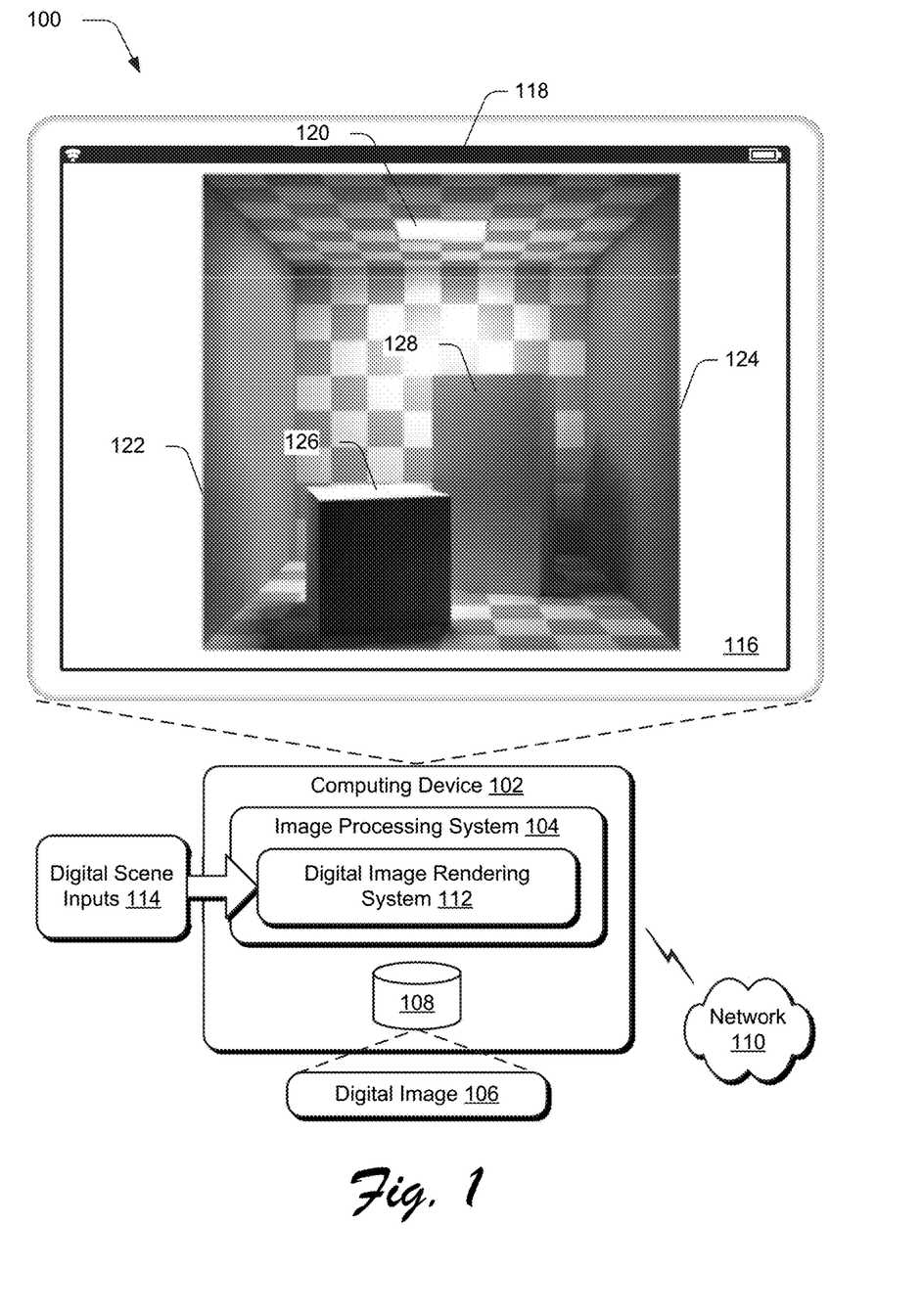
FIG. 1 is an illustration of a digital medium environment in an example implementation that is operable to employ light path correlation and rendering techniques described herein.

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including an image processing system 104. The image processing system 104 is implemented at least partially in hardware of the computing device 102 to create, process and/or transform a digital image 106, which is illustrated as maintained in storage 108 of the computing device 102. Such processing includes creation of the digital image 106, modification of the digital image 106, and rendering of the digital image 106 in a user interface for output, e.g., by a display device. Although illustrated as implemented locally at the computing device 102, functionality of the image processing system 104 may also be implemented as whole or part via functionality available via the network 110, such as part of a web service or "in the cloud."

An example of functionality incorporated by the image processing system 104 to process the image 106 is illustrated as a digital image rendering system 112. The digital image rendering system 112 is implemented at least partially in hardware of the computing device 102 to render the digital image 106 based on digital scene inputs 114. To achieve photo realism as part of the rendering, the digital image rendering system 112 is configured to synthesize light transport within a digital scene described by the digital scene inputs 114.

As previously described, conventional gradient domain Monte Carlo rendering utilizes the difference between correlated samples to reduce variance in generation of light values for pixels of a digital image. However, correlation in conventional gradient domain Monte Carlo rendering is performed for adjacent pixels in the digital image, and thus does not address the high dimensionality of a digital scene. For example, light affecting different pixels may originate from a variety of different paths that may be different for these adjacent pixels. As a result, conventional techniques are prone to error and introduce artifacts in the rendering of a digital image.

The digital image rendering system 112 described herein, however, generalizes criteria used for correlation of light path sampling such that light paths are correlated based on similarity of the light paths to each other. In this way, the digital image rendering system 112 exploits a correlation between light paths in the digital scene that do not fall into local neighborhoods in the image space, i.e., are not limited adjacent pixels in the digital image 106. This results in lower estimation variances, increased accuracy, and less artifacts when rendering the digital image 106 by the computing device 102. This may be further extended such that the similarity determination also takes into account material properties, geometric normals, or other surface properties that correspond to vertices of the light path that are used to make the similarity determination.

As illustrated in the user interface 116 displayed by the display device 118 of the computing device 102, for instance, a digital image 120 is captured of a digital scene defined using digital scene inputs 114. The digital scene includes a light source 120, walls 122, 124, and other objects 126, 128 that reflect light from the light source 120. By synthesizing light transport in a manner that mimics light transport in a real-world environment, the digital image 118 is photo realistic. Techniques are described in the following in which photo realism is achieved through correlation of light paths, which also reduces consumption of computational resources used in the rendering of the digital image 106. This makes the techniques described herein available to a wider range of users and performable in a reduced amount of time. Further discussion of these and other examples are included in the following description and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the combinations represented by the enumerated examples in this description.

Figure 2:
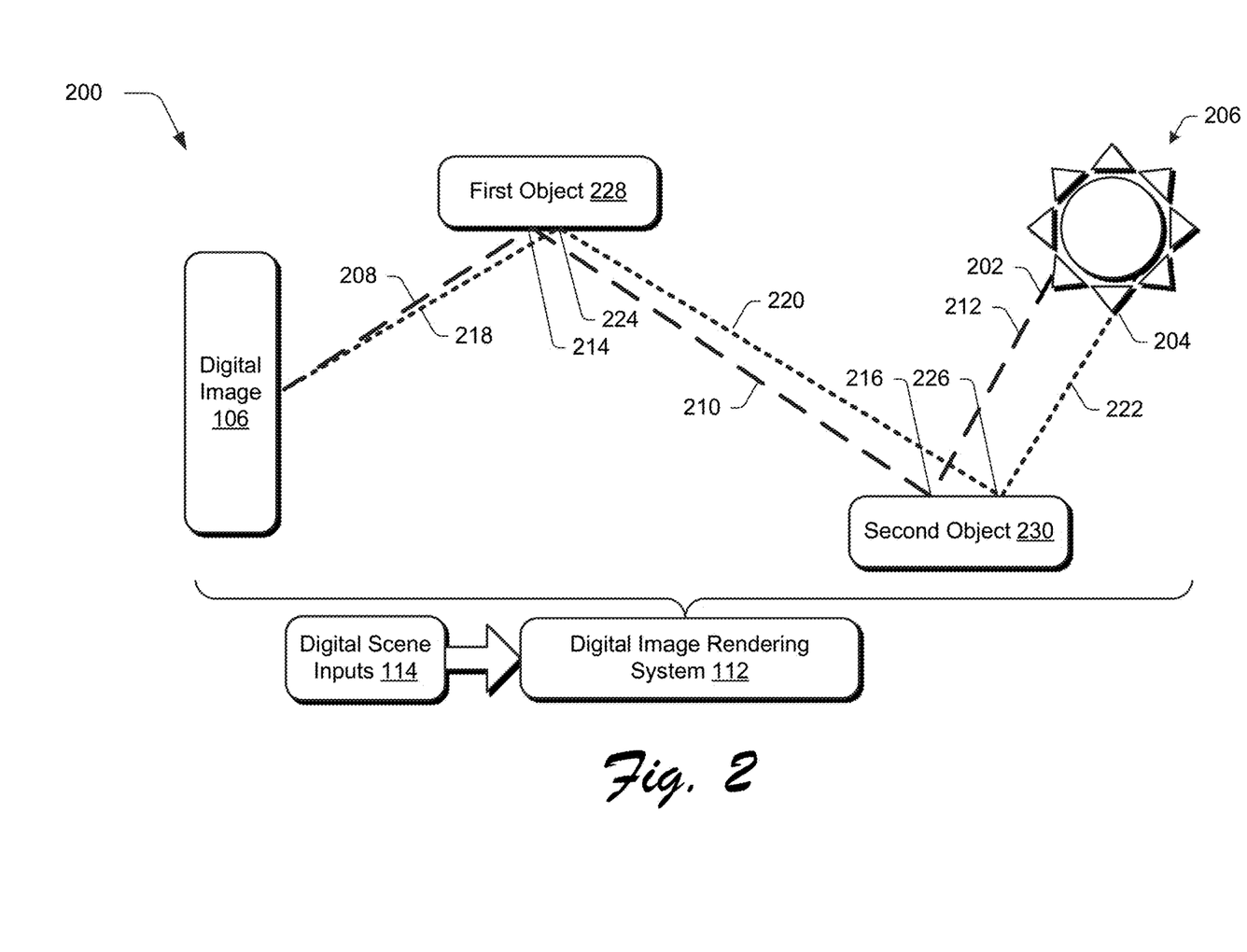
FIG. 2 depicts a digital scene in which light transport within the digital scene is described using a plurality of light paths that serve as a basis to render a digital image of the digital scene.

FIG. 2 depicts a digital scene 200 in an example implementation in which a plurality of lights paths is processed by the digital image rendering system 112 as part of rendering of a digital image 106. The digital scene 200, as described to the digital image rendering system 112 using digital scene inputs 114, includes first and second light paths 202, 204. The first and second light paths 202, 2024 extend from the digital image 106 through the digital scene 200 to a light source 206.

Each of the first and second light paths 202, 204 are formed as a combination of segments and vertices. The first light path 202, for instance, includes first, second, and third segments 208, 210, 212 joined by primary and second vertices 214, 216. The primary vertex 214 is the first vertex of the first light path 202, in order, progressing through the digital scene 200 from the digital image 106 to the light source 206. Likewise, the secondary vertex 216 is second in order between the digital image 106 and the light source 206. Thus, the order described by the vertices as primary, secondary, and so on describe an order progressing from the digital image 106 to the light source 206 within the digital scene 200.

Similarity, the second light path 204 includes first, second, and third segments 218, 220, 222 joined by respective primary and secondary vertices 224, 226. Thus, each vertex (e.g., the primary and second vertices 214, 224, 216, 226) connects a plurality of respective segments to each other. As a result, these vertices do not include a starting point (e.g., the digital image 106) nor an endpoint (e.g., the light source 206) in this example. The primary and secondary vertices 214, 224, 216, 226 further define points at which light of a respective light path reflects off respective objects 228, 230 in the digital scene 200. Thus, light transport and a light path taken by light within the digital scene 200 also includes properties of objects 228, 230 with which the light interacts, i.e., reflects. Accordingly, the digital image rendering system 112 is configured to take this into account as part of rendering the digital image 106, an example of which is described in greater detail below.

Figure 3:
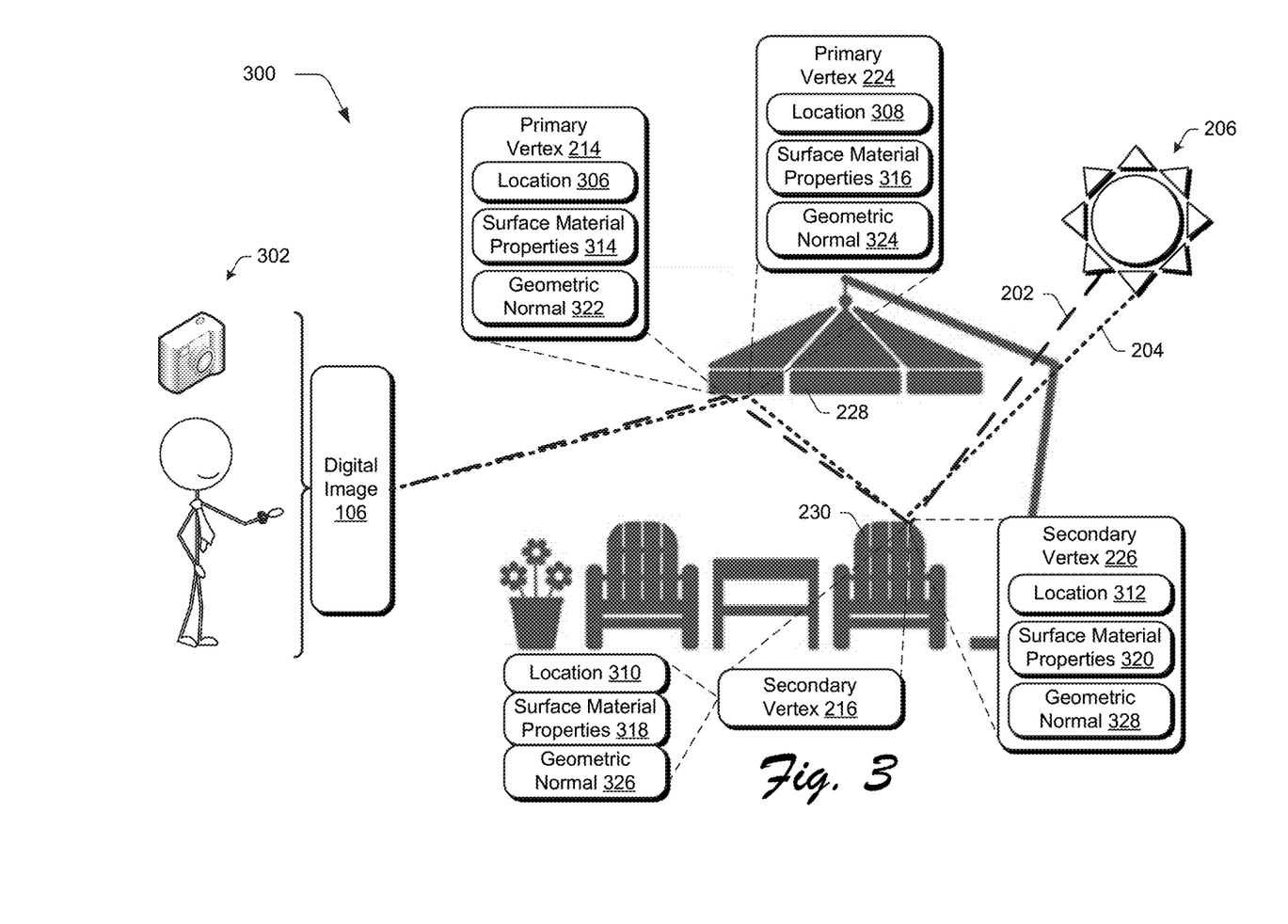
FIG. 3 depicts an example implementation of a digital scene in which a plurality of lights paths is processed by a digital image rendering system as part of rendering of a digital image based on similarity of the light paths, one to another.
Figure 4:
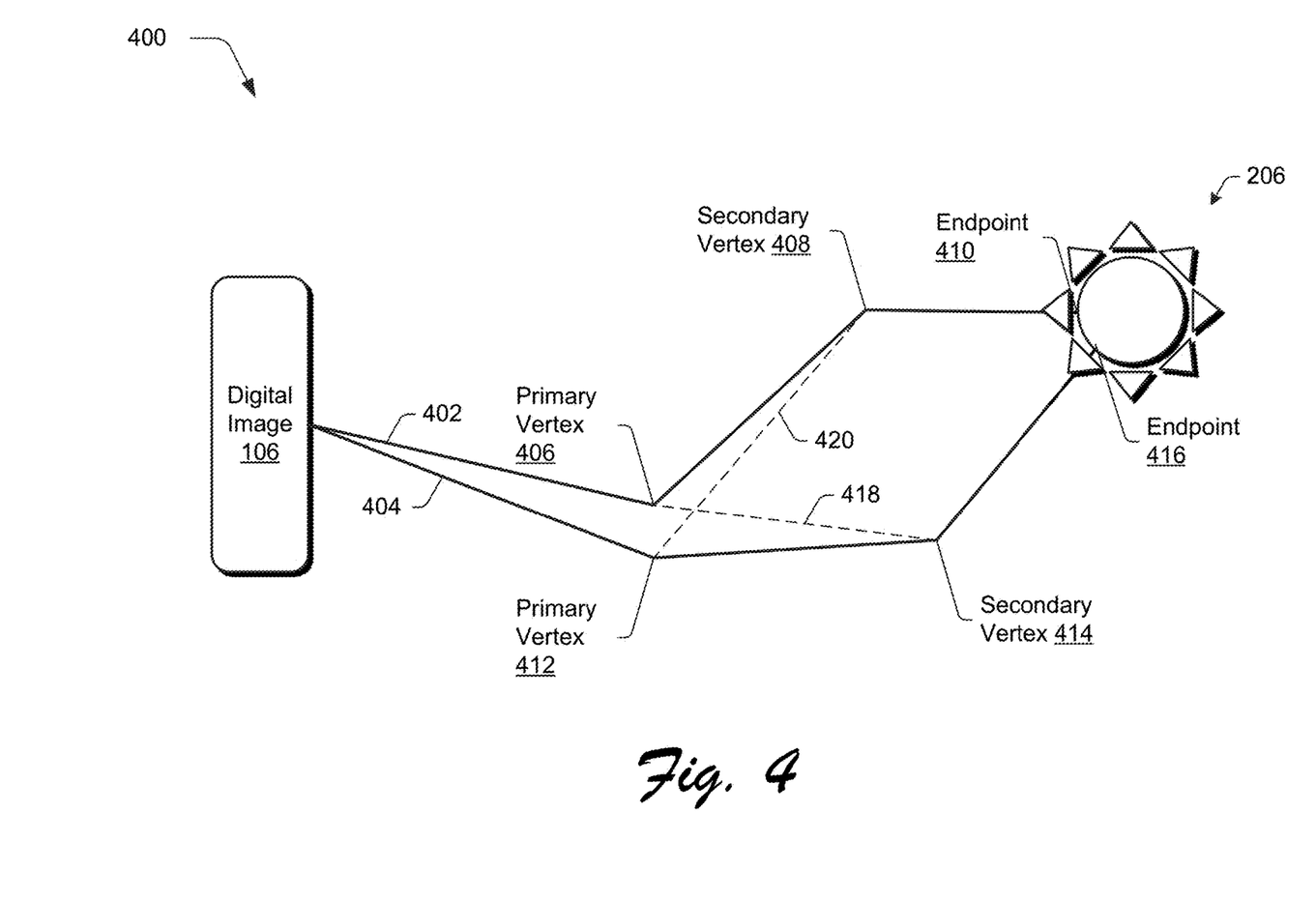
FIG. 4 depicts an example implementation in which light paths are reconstructed as part of correlated sampling and rendering of a digital image.
Figure 5:
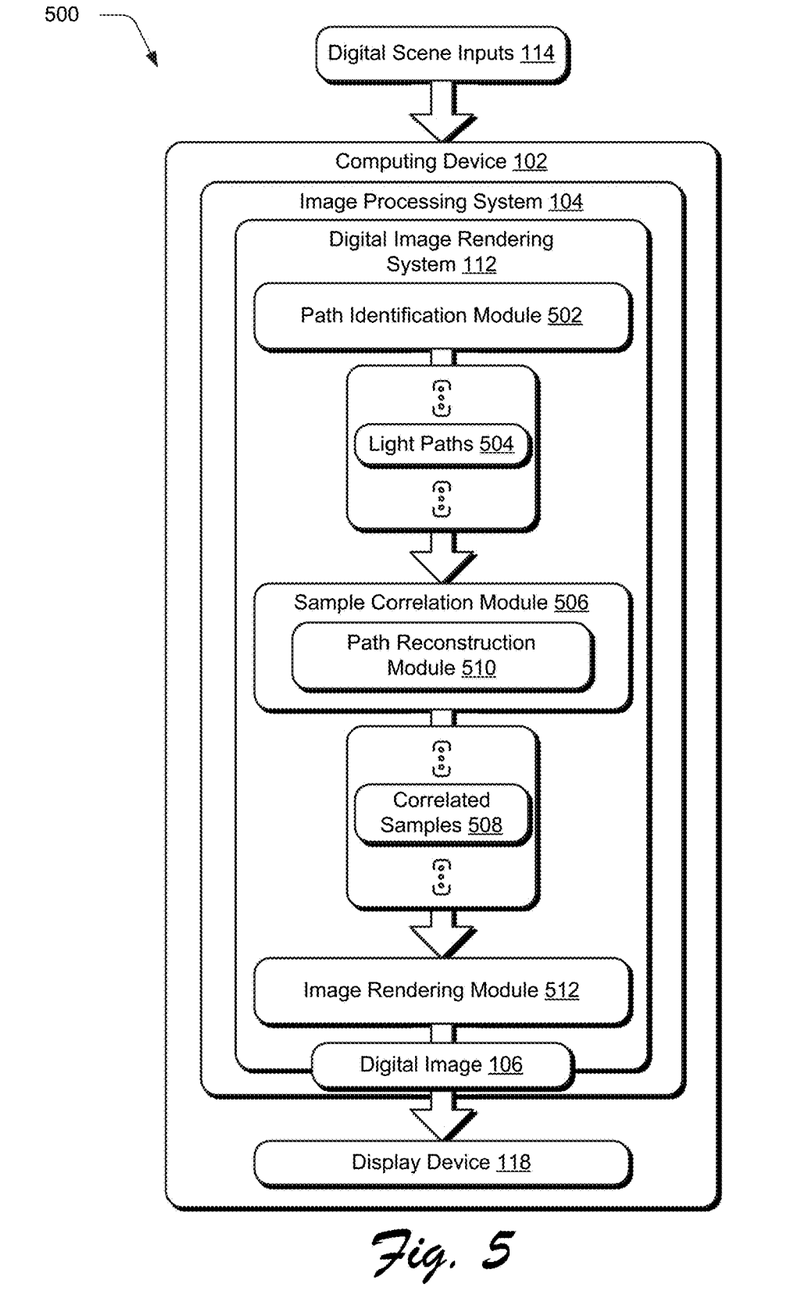
FIG. 5 depicts a system in an example implementation showing operation of the digital image rendering system of FIG. 1 in greater detail.
Figure 6:
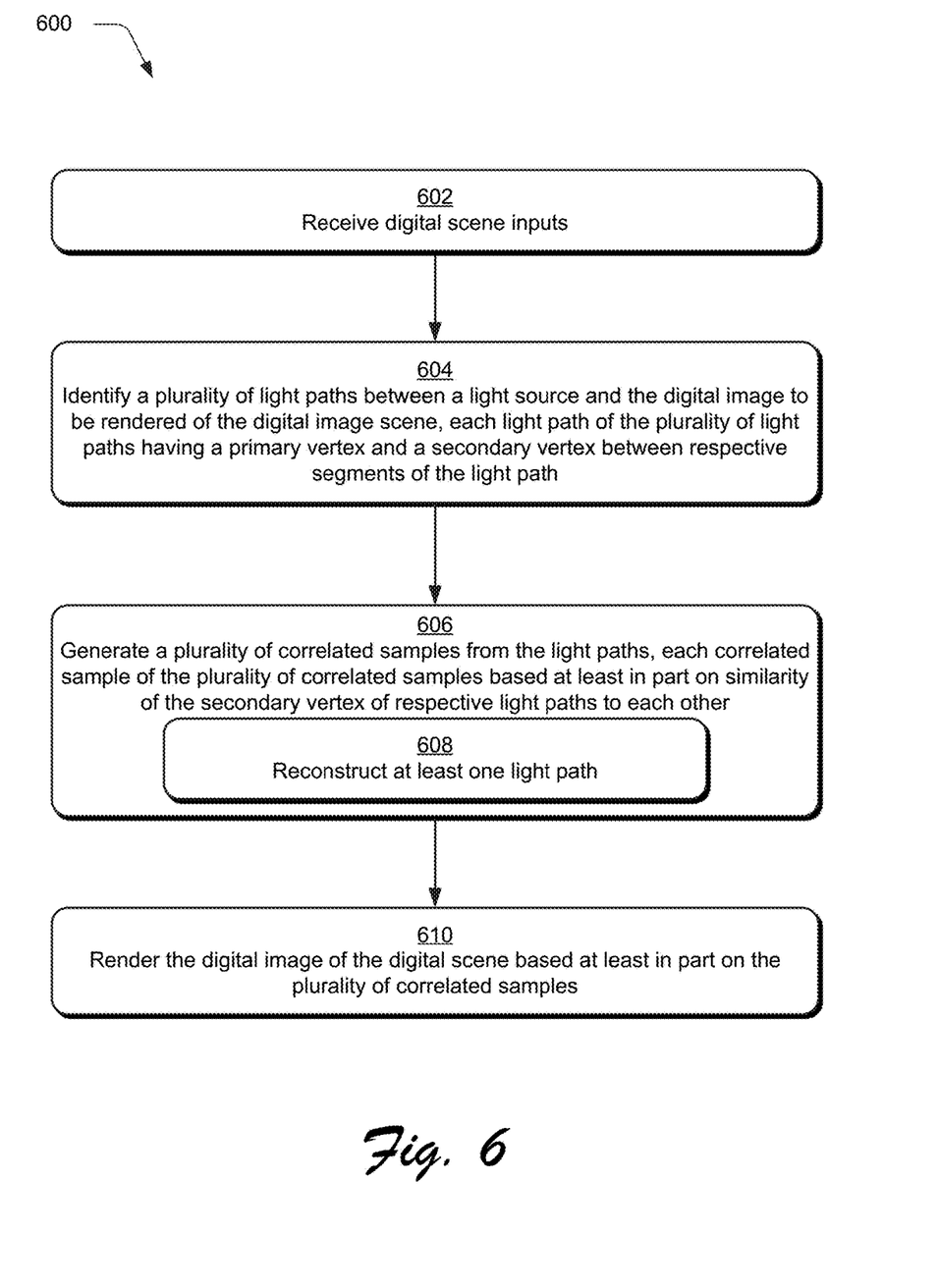
FIG. 6 is a flow diagram depicting a procedure in an example implementation in which a digital image is rendered of a digital scene based on light path correlation.

FIG. 3 depicts an example implementation of a digital scene 300 in which a plurality of light paths is processed by the digital image rendering system 112 as part of rendering of a digital image 106 based on similarity of the light paths, one to another. FIG. 4 depicts an example implementation 400 in which light paths are reconstructed as part of correlated sampling. FIG. 5 depicts a system 400 in an example implementation showing operation of the digital image rendering system 112 of FIG. 1 in greater detail as rendering a digital image. FIG. 6 depicts a procedure 600 in an example implementation in which a digital image is rendered of a digital scene based on light path correlation.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeable to FIGS. 3-6.

To begin, digital scene inputs 114 are received (block 602) by the digital image rendering system 112 that describe a digital scene, from which, the digital image 106 is to be rendered. An artist, for instance, may interact with the image processing system 104 to create a three-dimensional environment, including objects and material properties of those objects in the environment that are to be rendered as the digital image 106.

As shown in the digital scene 300 of FIG. 3, for instance, a user interacted with the image processing module 104 to specify a digital scene 300 that includes the sun and objects, such as a sun umbrella, chairs, table, and flowers. A digital image 106 is then rendered from this digital scene 300 as a two-dimensional representation. Thus, the digital image 106 describes a viewpoint of the three-dimensional digital scene as captured by a virtual camera or user 302 in two dimensions.

A plurality of light paths 504 are identified from the digital scene inputs 114 by a path identification module 402 that are formed between a light source 206 and the digital image 106 to be rendered of the digital scene 300. Each light path of the plurality of light paths includes a primary vertex and a secondary vertex between respective segments of the light path (block 604). In the digital scene 300 of FIG. 3, for instance, first and second light paths 204, 206 are illustrated. Each of these light paths include a respective primary vertex 214, 224 and a secondary vertex 216, 226. The primary and second vertices 214, 216, 224, 226 are formed by light reflection from surfaces of first and second objects 228, 230, which are a sun umbrella and a chair in this example.

Thus, the first and second light paths 202, 205 describe a progression of light as viewed by a user or camera 302 that defines a viewpoint of the digital scene 300 as encountering the first and second object 228, 230 and originating from the light source 206, e.g., the sun. Further, reflection of light of the light paths 202, 205 by these first and second object 228, 230 is further affected by properties of the objects, e.g., material surface properties, a geometric normal of surface of the objects, and so forth.

The identified light paths 504 are then received by a sample correlation module 506. The sample correlation module 506 is implemented at least partially in hardware of a computing device 102 to generate a plurality of correlated samples 508 generated from the light paths 504. In this example, each correlated sample of the plurality of correlated samples is based at least in part on similarity of the second vertex of respective light paths to each other (block 606). The correlation may be based on a variety of different characteristics by the sample correlation module 506.

Returning again to FIG. 3, the sample correlation module 506 in this example correlates samples based on similarity of properties of vertices along the light paths 202, 204 using a nearest neighbor search. The nearest neighbor search, for instance, may be based on locations 306, 308, 310, 312 of corresponding vertices 214, 222, 216, 226 to each other in the digital scene 300, e.g., coordinates within the digital scene 300. The sample correlation module 506, for instance, may example the identified light paths using a nearest neighbor search to determine that respective locations 306, 308 of the primary vertices 214, 224 as well as respective locations 310, 312 of the secondary vertices 216, 226 are sufficiently close (within a threshold) to each other for correlation as a correlated sample 508.

This nearest neighbor search may also be extended to take into account surface material properties 314, 316, 318, 320, geometric normals 322, 324, 326, 328, or other properties associated with objects 228, 230 that cause light reflection at a respective vertex. For example, the sample correlation module 506 may determine that although the secondary vertices 216, 226 are sufficiently similar with respect to location 310, 312, the surface material properties 318, 320 are sufficiently different such that the light paths 202, 204 do not form a correlated sample 508. In this way, the sample correlation module 506 may reduce and resulting visual artifacts in the rendering of the digital image 106. Thus, the sample correlation module 506 may determine similarity based on any one or a combination of properties of vertices of a light path. Further discussion of correlation and nearest neighbor search by the sample correlation module 506 is included in the Implementation Example section below.

In one example, at least one light path is reconstructed (block 608) as part of the sample correlation by a path reconstruction module 510 of the sample correlation module 506. As shown in FIG. 4, for instance, a digital scene 400 is shown that includes first and second light paths 402, 404. The first light path 402 includes a primary vertex 406, a secondary vertex 408, and an endpoint 410 at a light source 206. The second light path 404 also includes a primary vertex 412, a secondary vertex 414, and an endpoint 416 at a light source 206.

In an implementation, the similarity is based at least in part on similarity of secondary vertices 408, 414. This has been shown to increase accuracy and reduce variances in the rendering of the digital image 106 over techniques that rely on the primary vertex or the adjacency of pixels in the digital image as previously described.

In this example, the primary vertices 406, 412 are sufficiently similar with respect to location to be correlated. However, the second vertices 408, 414 are not. Accordingly, the path reconstruction module 510 is configured to reconstruct light paths to have sufficient similarity for correlation. In this example, the first light path 402 includes the primary vertex 406 and a secondary vertex 408. A first reconstructed path 418 is formed to be correlated with the first path 402 that includes the primary vertex 412 of the second path 404 along with the secondary vertex 408 of the first path 402, the reconstructed portion of which is illustrated through use of a dashed line. In this way, the primary and second vertices of both the first path 402 and the first reconstructed path 418 are then correlated based on similarity (e.g., location) in this example, although other properties may also be taken into account such as surface material or a geometric normal as previously described.

Likewise, the second light path 404 includes the primary vertex 412 and a secondary vertex 414. A second reconstructed path 420 is formed to be correlated with the second path 404 that includes the primary vertex 406 of the first path 402 along with the secondary vertex 414 of the second path 404, the reconstructed portion of which is also illustrated through use of a dashed line. Thus, the primary and second vertices of both the second path 404 and the second reconstructed path 420 are then correlated based on similarity (e.g., location) in this example, although other properties may also be taken into account such as surface material or a geometric normal as previously described. In this way, the path reconstruction module 410 may expand a sample size of correlated paths 508 in a computationally efficient manner that reduces variance and thus improves accuracy in the rendering of the digital image.

The correlated samples 508 are then passed to an image rendering module 512. The digital image 106 of the digital scene is rendered based at least in part on the plurality of correlated samples (block 610), e.g., for output to memory or a display device 118 for viewing by a user. The correlated samples 508 as previously described reduce variance of the samples and thus improve accuracy while also reducing consumption of computational resources. An implementation example involving digital image rendering using the light path correlation techniques described above is included in the following section.

Implementation Example

In conventional Monte Carlo rendering of the digital image 106, an integral of light transport is determined along all possible light paths connecting between the light sources and the camera (i.e., the viewpoint) as described as follows:

$$I_j = \int_\Omega h_j(x) f^*(x) d\mu(x)$$  Equation 1.

where $I_j$ is the rendering result color of pixel j, x is a light path sample. The values $\Omega\mu(x)$ and $f^*(x)$ are the domain, area measurement and the light transport of x respectively, whereas $h_j(x)$ is the pixel reconstruction kernel.

A classic Monte Carlo solution to Equation 1 above is to compute an unbiased estimation $\hat{I}_j$ from light path samples $\{x_i\}$ as follows:

$$\hat{I}_j = \frac{1}{N} \frac{f(x_i)}{p(x_i)},$$  Equation 2 where N is the number of $x_i$, $f(\bar{x})$ is $f(\bar{x}) d\mu(x)$, and $p(x_i)$ is the sampling probability density function of (PDF) of $x_i$.

In conventional Monte Carlo rendering, every single light path is an independent sample. The estimation of the variance of $\hat{I}_j$ is determined by the variance of $f(x_i)/p(x_i)$ and sampling scale N as follows:

$$Var[\hat{I}_j] = \frac{1}{N} Var\left[\frac{f(x_i)}{p(x_i)}\right],$$  Equation 3 where Var [·] indicates the operation of variance.

On the other hand, gradient domain Monte Carlo rendering formulates the rendering of I as an optimization problem with respect to both the primary pixel color $I_j$ and its gradient $\nabla I_j$ as follows:

$$\arg\min_I \sum_j \left( \|\lambda(I_j - \hat{I}_j)\|_2^2 + \|(\nabla I_j - \hat{\nabla} I_j)\|_2^2 \right),$$  Equation 4 where $\nabla$ is the operator of gradient and $\hat{\nabla} I_j$ is a Monte Carlo estimation of $\nabla I_j$, $\|\cdot\|_2$ indicates the $L_2$ norm. $\lambda$ is the relative weighting between the primary and the gradient images in reconstruction in range $[0, \infty]$. If $\lambda \to \infty$, the gradient domain algorithm in Equation 4 is equivalent to the traditional Monte Carlo rendering in Equation 2. For natural images, usually the gradient is very sparse, which means Var $[\hat{I}_j]$>Var $[\hat{\nabla} I_j]$. Thus, Equation 4 with a non-zero value of $\lambda$ exhibits less variance.

The gradient in image space (e.g., a domain of the digital image 106) has two components, corresponding to the horizontal and vertical differences as follows:

$$\nabla I_j = I_j^{dx} + I_j^{dy},$$

$$I_j^{dx} = I_{P+1,Q} - I_j,$$

$$I_j^{dy} = I_{P,Q+1} - I_j,$$  Equation 5 where P, Q are the coordinate of pixel j, and $I_{P+1,Q}$ and $I_{P,Q+1}$ are the primary colors of its right and above adjacent pixels respectively. A Monte Carlo sample of $I_j^{dx}$ or $I_j^{dy}$ can be any two light path samples located in the two adjacent pixels separately. To further exploit the correlation and reduce the computation cost, a pair of correlated light paths generated by deterministic shifting are used in this technique. Assume x is defined using s+1 connected vertices, $x_0 x_1 x_2 \ldots x_s$, where $x_0$ and $x_s$ are located in the camera and the light resources respectively. Its correlated counterpart only replaces $x_1$ with $x'_1$, $x_0 x'_1 x_2 \ldots x_s$, as long as $x_1'$ falls into the adjacent pixel with the same inner-pixel offset as $x_1$.

The image reconstruction according to Equation 4 can be achieved by spatial filtering as follows:

$$I \approx \frac{1}{2\pi} K_0(2\pi\lambda\sqrt{P^2 + Q^2}) * \left(\lambda^2 \hat{I} - \hat{I}^{dx^2} - \hat{I}^{dy^2}\right),$$  Equation 6 where $\hat{I}_{P,Q}^{dx^2} = \hat{I}_{P,Q}^{dx} - \hat{I}_{P-1,Q}^{dx}$ and $\hat{I}_{P,Q}^{dy^2} = \hat{I}_{P,Q}^{dy} - \hat{I}_{P,Q-1}^{dy}$. The value of $K_0$ is the zeroth order modified Bessel function of the second kind. The reconstruction according to Equation 6 has two limitations. First, the filtering kernel has infinite support for an unbiased result. Practically, the distant value cut off can be used without visible error, but it brings biases in theory. Second, the filtering kernel is invariant throughout the whole image space which causes considerable light leaking around sharp edges.

The reconstruction of a pixel color with filtering as Equation 6 can be formulated as a linear combination of its primary color and its difference from all other pixels in the filtering window as follows:

$$I_j \approx \sum_{k \in N(j)} \left( \tilde{\alpha}_k \hat{I}_k + \tilde{\alpha}_{j,k} \hat{I}_{j,k} \right),$$  Equation 7 where $k \in \mathcal{N}(j)$ indicates pixel k is in the filtering window of pixel j, and $\hat{I}_{j,k}$ is Monte Carlo estimation of $I_j - I_k$. Equation 7 provides unbiased estimation with arbitrary coefficients as long as the coefficients satisfy the following:

$$\tilde{\alpha}_{j,j} = 0, \tilde{\alpha}_k = \tilde{\alpha}_{j,k}$$
$$\tilde{\alpha}_j + \sum_{k \in N(j)} \tilde{\alpha}_{j,k} = 1.$$  Equation 8

The Poisson reconstruction in Equation 6 is a special case of Equation 7 with an infinity-sized filtering window. Therefore, an optimal selection of coefficients removes the two limitations of traditional Poisson reconstruction in Equation 6.

Another form of Equation 7 is a convex combination of correlation between pixel j and every each pixel k in its filtering window as follows:

$$I_j \approx \sum_{k \in N(j)} w_{j,k} \left( \alpha_{j,k} \hat{I}_j + (1 - \alpha_{j,k})(\hat{I}_k + \hat{I}_{j,k}) \right)$$  Equation 9 satisfying $$w_{j,k}, \alpha_{j,j} \in [0, 1],$$  Equation 10

-continued $$\sum_{k \in \mathcal{N}(j)} w_{j,k} = 1.$$

The values of $w_{j,k}$ and $\alpha_{j,k}$ may be decoupled because the optimal $w_{j,k}$ is dependent on the covariance between different k pixels, while the optimal $\alpha_{j,k}$ relates to the two pixel j and k only. The following is built upon Equation 9.

Image space gradient domain Monte Carlo rendering above exploits the correlation between adjacent pixels. In the following, light paths are used to directly describe light transport in a digital scene. Given a light path sample $x_j = x_0^j x_1^j \ldots x_{s_j}^j$, the outgoing light transport from vertex $x_d^j$ to $x_{d-1}^j$ is denoted as $L(x_{d-1}^j \leftarrow x_d^j)$. From the light path $x_j$ itself, a conventional Monte Carlo estimation is defined as $\hat{L}_j^d = L(x_{d-1}^j \leftarrow x_d^j \leftarrow x_{d+1}^j \ldots)$. With a correlated light path sample $x_k = x_0^k x_1^k \ldots x_{s_k}^k$, the counterpart light transport estimation is $\hat{L}_k^d = L(x_{d-1}^k \leftarrow x_d^k \leftarrow x_{d+1}^k)$.

In the following discussion, two correlated samples of light paths are denoted as $x_{j \to k} = x_0^j \ldots x_d^j x_{d+1}^k \ldots x_{s_k}^k$ and $x_{k \to j} = x_0^k x_0^k \ldots x_d^k x_{d+1}^j$. The expectation of the estimation on these samples are the same as $x_j$ and $x_k$ respectively, that $E[\hat{L}_{j \to k}^d] = E[\hat{L}_j^d]$ and $E[\hat{L}_{k \to j}^d] = [\hat{L}_k^d]$.

Then the estimation of the difference between $L_j^d L_k^d$ and a can be determined as follows:

$$\hat{L}_{j,k}^d = \sigma_3^d L_3^d + (1-\sigma_3^d) L_{3 \to k}^d - \sigma_k^d \to k^d - \sigma_k^d L_k^d - (1-\sigma_k^d) L_{k \to j}^d,$$
Equation 11

Equation 11 where $\sigma_j^d$ and $\sigma_k^d$ are multiple importance sampling weight. As a result, an unbiased estimation of $L_j^d$ may be obtained similarly to Equation 9 as follows:

$$L_j^d \approx \sum_{k \in \mathcal{N}(j)} w_{j,k} \left( \alpha_{j,k} \hat{L}_j^d + (1 - \alpha_{j,k})(\hat{L}_k^d + \hat{L}_{j,k}^d) \right).$$
Equation 12

The difference between Equation 12 compared with Equation 9 is that Equation 12 is applied to the estimation of the light transport for a segment in light path $x_{d-1}^j \to x_d^j$ instead of the integral color of a pixel j. This introduces two changes of practical algorithms from gradient domain rendering techniques. First, Poisson reconstruction is a one-time post-processing in gradient domain rendering. Monte Carlo samples of primary color and gradient are accumulated in pixels before the reconstruction. The techniques described herein may reconstruct the correlated samples from individual light path samples, which are finally accumulated into pixels to produce the rendered image. Second, gradient domain rendering is specifically designed for the first intersection vertex where d=1. The techniques described herein, however, may be used recursively with a decreasing depth d. For example with a given light path samples $\{x_k\}$, equation 12 may be computed for d=4 initially, then the reconstructed $\{L_j^4\}$ are used for reconstruction $\{L_j^3\}$, $\{L_j^2\}$ recursively to achieve reconstruction of $\{L_j^3\}$ for the final rendering image.

The neighborhood N (j) can be arbitrarily defined. As Equation 12 is formulated with respect to light path samples, the neighborhood is defined as dependent on the light path properties. In the following, spatial neighborhood criteria (e.g., location) are used such that $x_k$ is a correlated sample of $x_j$ if $x_d^j$ and $x_d^k$ are similar, location wise. A k-nearest-neighbor scheme is employed to gather the N nearest $x_d^k$, thus the weight in Equation 12 is simply a uniform $w_{j,k}=1/N$.

The neighborhood criteria may be further extended by considering the geometry normals and surface materials, that $x_j$ and $x_k$ are supposed to be uncorrelated if the scenes features on $x_d^j$ and $x_d^k$ are very different even if these vertices are spatially close to each other as previously described.

A general form of neighborhood can be defined by an indicator function as follows:

$$\mathbb{1}(x_j, x_k, d) = \begin{cases} 1, & k \in \mathcal{N}(j) \\ 0, & k \notin \mathcal{N}(j) \end{cases}.$$
Equation 13

The indicator function can be arbitrary. The spatial distance, geometry normal and surface material are describe above, but it should be readily apparent that any other features along the light path samples can be included as well. With the general form of neighborhood, N used in the weight $w_{j,k}$ is the actual number of correlated light path samples found.

The neighborhood gathering can be taken as a specific weighting function of $w_{j,k}$, that samples included are with the same weighting while the others are with zero weighting. The efficiency of the weighting is implicitly determined by the design of the indicator function $\mathbb{1}(x_j, x_k, d)$. According to Equation 12, the optimal coefficient $\alpha_{j,k}$ is related, solely, to the estimation variances of vertices j and k, Var $[\hat{L}_j^d]$ and Var $[\hat{L}_k^d]$, which can be approximated in preprocessing or with an iterative scheme.

In the discussion above, a general correlated Monte Carlo sampling technique is described. The correlation is determined by a more general neighborhood gathering according to the properties along the light path samples instead of pixel integral in image space. In the examples above, location (e.g., spatial distance), geometry normal and surface material are used as the criteria of neighborhood to determine similarity of light paths, one to another, and generate correlated Monte Carlo samples with increased flexibility.

Example System and Device

Figure 7:
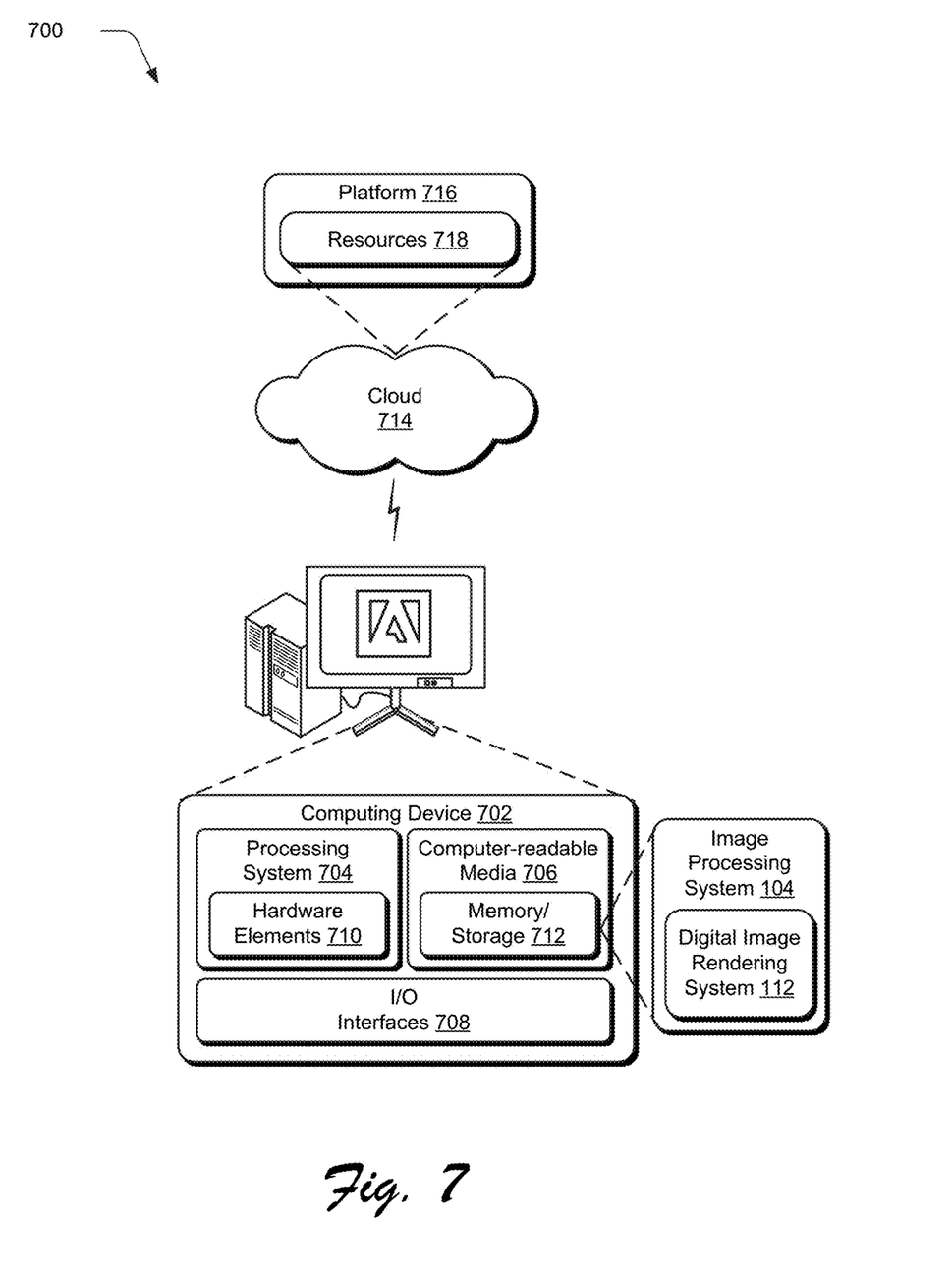
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image processing system 104 and digital image rendering system 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to render a digital image of a digital scene, a method implemented by at least one computing device, the method comprising:
   identifying, by at least one computing device, a plurality of light paths between a light source and the digital image to be rendered of the digital scene, each light path of the plurality of light paths having a primary vertex and a secondary vertex between respective segments of the light path, the primary vertex corresponding to a first light reflection location that is closer along the light path to the digital image to be rendered than a second light reflection location corresponding to the secondary vertex;
   generating, by the at least one computing device, a reduced number of light paths from the plurality of light paths by generating a plurality of correlated samples from the plurality of light paths, each correlated sample of the plurality of correlated samples in the reduced number of light paths based at least in part on similarity of the secondary vertex of respective said light paths to each other; and
   rendering, by the at least one computing device, the digital image of the digital scene using the plurality of correlated samples from the reduced number of light paths.

2. The method as described in claim 1, wherein the similarity of the secondary vertex of the respective said light paths to each other is based at least in part on a determination that respective locations of the secondary vertices are within a threshold distance to each other.

3. The method as described in claim 1, wherein the similarity of the secondary vertex of the respective said light paths to each other is based at least in part on similarity of respective surface material properties within the digital scene.

4. The method as described in claim 1, wherein the similarity of the secondary vertex of the respective said light paths to each other is based at least in part on similarity of respective geometric normals within the digital scene.

5. The method as described in claim 1, wherein the similarity of the secondary vertex of the respective said light paths to each other is determined using a nearest neighbor technique based on surface materials or geometric normals.

6. The method as described in claim 1, wherein the generating of the plurality of correlated samples includes reconstructing at least one light path.

7. The method as described in claim 1, wherein the rendering is based on a Monte Carlo rendering technique using the plurality of correlated samples.

8. The method as described in claim 1, wherein both the primary vertex and the secondary vertex connect two respective segments of the light path to each other between the light source and the digital image.

9. In a digital medium environment to render a digital image of a digital scene, a system comprising:
   a path identification module implemented at least partially in hardware of a computing device to identify a plurality of light paths between a light source and the digital image to be rendered of the digital scene, each light path of the plurality of light paths having a primary vertex and a secondary vertex between respective segments of the light path, the primary vertex corresponding to a first light reflection location that is closer along the light path to the digital image to be rendered than a second light reflection location corresponding to the secondary vertex;
   a sample correlation module implemented at least partially in hardware of the computing device to generate a reduced number of light paths from the plurality of light paths by generating a plurality of correlated samples from the plurality of light paths, each correlated sample of the plurality of correlated samples based on similarity of the secondary vertex of respective said light paths to each other; and
   an image rendering module implemented at least partially in hardware of the computing device to render the digital image of the digital scene using the plurality of correlated samples from the reduced number of light paths.

10. The system as described in claim 9, wherein the similarity of the secondary vertex of the respective said light paths to each other is based at least in part on a determination that respective locations of the secondary vertices are within a threshold distance to each other.

11. The system as described in claim 9, wherein the similarity of the secondary vertex of the respective said light paths to each other is based at least in part on similarity of respective surface material properties within the digital scene.

12. The system as described in claim 9, wherein the similarity of the secondary vertex of the respective said light paths to each other is based at least in part on similarity of respective geometric normals within the digital scene.

13. The system as described in claim 9, wherein the similarity of the secondary vertex of the respective said light paths to each other is determined using a nearest neighbor technique based on respective locations, surface materials, or geometric normals.

14. The system as described in claim 9, further comprising a path reconstruction module implemented at least partially in hardware of the computing device to reconstruct at least one light path as part of generating of the plurality of correlated samples.

15. The system as described in claim 9, wherein both the primary vertex and the secondary vertex of a respective said light path connect two respective segments of the light path to each other between the light source and the digital image.

16. In a digital medium environment to render a digital image of a digital scene, a system comprising:

means for identifying a plurality of light paths between a light source and the digital image to be rendered of the digital scene, each light path of the plurality of light paths having a primary vertex and a secondary vertex between respective segments of the light path, the primary vertex corresponding to a first light reflection location that is closer along the light path to the digital image to be rendered than a second light reflection location corresponding to the secondary vertex;

means for generating a reduced number of light paths from the plurality of light paths by generating a plurality of correlated samples from the plurality of light paths, each correlated sample of the plurality of correlated samples in the reduced number of light paths based on similarity of location of the secondary vertex of respective said light paths to each other within the digital scene; and means for rendering the digital image of the digital scene using the plurality of correlated samples from the reduced number of light paths.

17. The system as described in claim 16, wherein the similarity of the secondary vertex of the respective said light paths to each other is further based at least in part on similarity of respective surface material properties within the digital scene.

18. The system as described in claim 16, wherein the similarity of the secondary vertex of the respective said light paths to each other is further based at least in part on similarity of respective geometric normals within the digital scene.

19. The system as described in claim 16, wherein the similarity of the secondary vertex of the respective said light paths to each other is determined using a nearest neighbor technique based on surface materials or geometric normal.

20. The system as described in claim 16, wherein the similarity of the secondary vertex of the respective said light paths to each other is based at least in part on a determination that respective locations of the secondary vertices are within a threshold distance to each other.

* * * * *